(12) United States Patent
Kametani (10) Patent No.: US 6,380,987 B1
(45) Date of Patent: Apr. 30, 2002

(54) MOTION VECTOR DETECTION CIRCUIT ENABLING HIGH-SPEED SEARCH OF MOTION VECTOR

(75) Inventor: Jun Kametani, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/320,538

(22) Filed: May 27, 1999

(30) Foreign Application Priority Data

Jun. 1, 1998 (JP) .......................................... 10-151265

(51) Int. Cl.[7] ................................................ H04N 7/36
(52) U.S. Cl. .................. 348/699; 375/240.16; 382/107; 382/236
(58) Field of Search ..................... 348/699; 375/240.16, 375/240.17; 382/107, 236; H04N 7/36

(56) References Cited

U.S. PATENT DOCUMENTS

| | | | |
|---|---|---|---|
| 5,400,087 A | | 3/1995 | Uramoto et al. ............ 348/699 |
| 5,416,522 A | | 5/1995 | Igarashi ...................... 348/699 |
| 5,659,364 A | * | 8/1997 | Aoki et al. .................. 348/699 |
| 5,696,836 A | | 12/1997 | Yoshino et al. ............. 348/699 |
| 5,886,743 A | * | 3/1999 | Oh et al. ................ 375/240.16 |
| 5,949,486 A | * | 9/1999 | Ishihara et al. ............. 348/699 |
| 6,122,317 A | * | 9/2000 | Hanami et al. ........ 375/240.16 |

FOREIGN PATENT DOCUMENTS

| | | |
|---|---|---|
| JP | 1-295379 | 11/1989 |
| JP | 6-113290 | 4/1994 |
| JP | 11-196421 | 7/1999 |

OTHER PUBLICATIONS

Japanese Office Action, dated Aug. 18, 2000, with English language translation of Japanese Examiner's comments.
Tetsuo, N., "Motion Vector Detector," Patent Abstracts of Japan, Publication No. 07203457, Publication Date Aug. 4, 1995.
Hirohisa, Y. & Toshio, N., "Pipeline Structure Calculation Circuit," Patent Abstracts of Japan, Publication No. 11196421, Publication Date Jul. 21, 1999.
Takeshi, O., "Block Matching Type Movement Detecting Circuit," Patent Abstracts of Japan, Publication No. 1295379, Publication Date Nov. 29, 1989.

\* cited by examiner

*Primary Examiner*—Howard Britton
(74) *Attorney, Agent, or Firm*—Whitham, Curtis & Christofferson (57) ABSTRACT

The motion vector detection circuit including a register group for storing each pixel data of a macro block which is obtained by dividing a frame picture to be coded into a plurality of macro blocks of m pixels by n lines and a register matrix of m×n arrangement having two-dimensional or one-dimensional structure for storing each pixel dada of a plurality of comparison target blocks of m pixels by n lines within a search range of a predetermined size set in a frame picture immediately preceding or succeeding in time the frame picture, compares a macro block in the register group and a comparison target block in the register matrix to specify a comparison target block most similar to the macro block as a current coding target, thereby conducting motion vector search.

12 Claims, 5 Drawing Sheets

MOTION VECTOR DETECTION CIRCUIT ENABLING HIGH-SPEED SEARCH OF MOTION VECTOR

BACKGROUND OF THE INVENTION

1. Field of the Invention

The present invention relates to a motion picture motion compensating frame-to-frame predictive coding device and, more particularly, to a motion vector detection circuit capable of executing motion vector search processing at a high speed.

2. Description of the Related Art

In conventional motion picture coding devices employing a motion picture motion compensating frame-to-frame predictive coding system whose representative is MPEG or H.261, a frame picture to be coded is divided into small regions of 16 pixels by 16 lines called macro blocks and for each macro block, the frame picture is compared with an immediately preceding (or immediately succeeding) frame picture which is locally decoded to determine to which part of the immediately preceding (or succeeding) frame picture each macro block corresponds. The above-described series of processing is called motion vector search and enables drastic compression of the volume of encoding by executing motion compensation based on obtained motion vectors.

On the other hand, the biggest problem with real-time operation of such a motional picture coding device is how much a processing time of this motion vector search can be reduced. More specifically, a common method of obtaining a motion vector is, assuming that fixed bounds in the horizontal direction and the vertical direction with respect to the position of a macro block to be coded is a search range, matching each pixel (256 pixels in MPEG2/H.261) within the macro block with a block of the same size within the search range to obtain a region having a minimum value, and defining a difference in a position in space between the region and the macro block as a motion vector.

For strictly searching a motion vector here, it is necessary to conduct matching while shifting the macro block one pixel by one pixel to every nook and corner in the search range. As the search range is enlarged, enormous volume of computation will be required.

As an example, in a case where a search range with a width from −15 pixels to +15 pixels in both the horizontal and vertical directions with respect to a macro block is searched using a microprocessor, the volume of arithmetic required for one trial includes 256 times of memory accesses, 256 times of subtractions, 256 times of turning the results into absolute values, 256 times of addition of the results of the absolute values and one time of comparison with a former addition result, 961 (31×31) times of repetition of which arithmetic determines one motion vector.

Therefore, a motion picture coding device which executes real-time processing ordinarily requires hardware dedicated to motion vector search. Calculation of a sum of difference absolute values between 256 pixels, for example, may be realized by processing by 256 parallel arithmetic units.

The problem in this case, however, is the number of times of data reading from a frame memory for parallel arithmetic. More specifically, since 256 times of memory accesses is executed per one trial, 246,016 (256×961) times of memory accesses will be required for all the trials per one motion vector, which is a bottleneck in dedicated hardware.

As described in the foregoing, for realizing real-time processing, conventional motion vector detection circuits should adopt an expensive high-speed memory, reduce a motion vector search range or use a plurality of motion vector detection circuits in parallel.

SUMMARY OF THE INVENTION

A first object of the present invention is to provide a motion vector detection circuit, intended to solve the above-described problems, which is capable of conducting high-speed coding of a motion picture by executing motion vector search at a high speed.

A second object of the present invention is to provide a motion vector detection circuit allowing a sequencer of a control means (controller) to be simply structured and a motion vector search range to be changed with ease.

A third object of the present invention is to provide a motion vector detection circuit enabling reduction of a circuit scale while reducing the number of times of data reading from a frame memory.

According to one aspect of the invention, a motion vector detection circuit for conducting motion vector search by, with a frame picture as a coding target being divided into a plurality of macro blocks of m pixels by n lines, comparing a plurality of comparison target blocks of m pixels by n lines within a search range of a predetermined size set in a frame picture immediately preceding or succeeding in time the frame picture and the macro block as the current coding target to specify a comparison target block most similar to the macro block as the current coding target, comprises first storage means for storing each pixel data of the macro block as the current coding target, second storage means of m by n matrix arrangement having two-dimensional or one-dimensional structure for storing each pixel data of the comparison target block, arithmetic means for performing parallel arithmetic of an absolute value of a difference between the corresponding pixels in the comparison target block stored in the second storage means and in the macro block stored in the first storage means to calculate a sum of the respective difference absolute values, result holding means for holding the sum of difference absolute values, and control means for updating the result holding means by the sum of difference absolute values from the arithmetic means only when the sum of difference absolute values from the arithmetic means is smaller than a sum of difference absolute values held in the result holding means and causing the second storage means to store each pixel data of other the comparison target block which comes next at a position shifted by one pixel or one line within the search range.

In the preferred construction, the second storage means is composed of a number m×n of registers which have two-dimensional structure where inputs and outputs of laterally adjacent registers are bidirectionally connected and inputs and outputs of vertically adjacent registers are unidirectionally connected.

In another preferred construction, the second storage means is composed of a number m×n of registers which have two-dimensional structure where inputs and outputs of laterally adjacent registers are bidirectionally connected and inputs and outputs of vertically adjacent registers are unidirectionally connected, and the register is composed of a flip-flop and a four-input one-output selector.

In another preferred construction, the second storage means is composed of a number m×n of registers which have one-dimensional structure where inputs and outputs of laterally adjacent registers are unidirectionally connected.

In another preferred construction, the second storage means is composed of a number m×n of registers which have one-dimensional structure where inputs and outputs of laterally adjacent registers are unidirectionally connected, and the register is composed of a flip-flop and a two-input one-output selector.

In another preferred construction, the control means, at the time of updating the result holding means by the sum of difference absolute values from the arithmetic means, stores reference position data of the comparison target block corresponding to the sum of difference absolute values.

In another preferred construction, the arithmetic means comprises subtraction means for performing subtraction between the corresponding pixels in the comparison target block and the macro block, absolute value arithmetic means for turning the result of subtraction between the pixels into an absolute value to obtain the difference absolute value, and addition means for adding the difference absolute values to calculate the sum of difference absolute values.

In another preferred construction, the motion vector detection circuit further comprises comparison means for comparing the sum of difference absolute values from the arithmetic means and a sum of difference absolute values held in the result holding means, wherein the control means updates the result holding means by the sum of difference absolute values from the arithmetic means only when the sum of difference absolute values from the arithmetic means is smaller than a sum of difference absolute values held in the result holding means based on a comparison result from the comparison means.

According to another aspect of the invention, a motion vector detection circuit for conducting motion vector search by, with a frame picture as a coding target being divided into a plurality of macro blocks of m pixels by n lines, comparing a plurality of comparison target blocks of m pixels by n lines within a search range of a predetermined size set in a frame picture immediately preceding or succeeding in time the frame picture and the macro block as the current coding target to specify a comparison target block most similar to the macro block as the current coding target, comprises first storage means for storing each pixel data of the macro block as the current coding target, second storage means of m by n matrix arrangement having two-dimensional or one-dimensional structure for storing each pixel data of the comparison target block, and control means for conducting comparison processing of the comparison target block stored in the second storage means and the macro block stored in the first storage means while sequentially storing, in the second storage means, each pixel data of other the comparison target block which comes next at a position shifted by one pixel or one line within the search range.

In the preferred construction, the second storage means is composed of a number m×n of registers which have two-dimensional structure where inputs and outputs of laterally adjacent registers are bidirectionally connected and inputs and outputs of vertically adjacent registers are unidirectionally connected.

In another preferred construction, the second storage means is composed of a number m×n of registers which have one-dimensional structure where inputs and outputs of laterally adjacent registers are unidirectionally connected.

In another preferred construction, the motion vector detection circuit further comprises arithmetic means for performing parallel arithmetic of an absolute value of a difference between the corresponding pixels in the comparison target block stored in the second storage means and in the macro block stored in the first storage means to calculate a sum of the respective difference absolute values, and result holding means for holding the sum of difference absolute values, wherein the control means updates the result holding means by the sum of difference absolute values from the arithmetic means only when the sum of difference absolute values from the arithmetic means is smaller than a sum of difference absolute values held in the result holding means.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
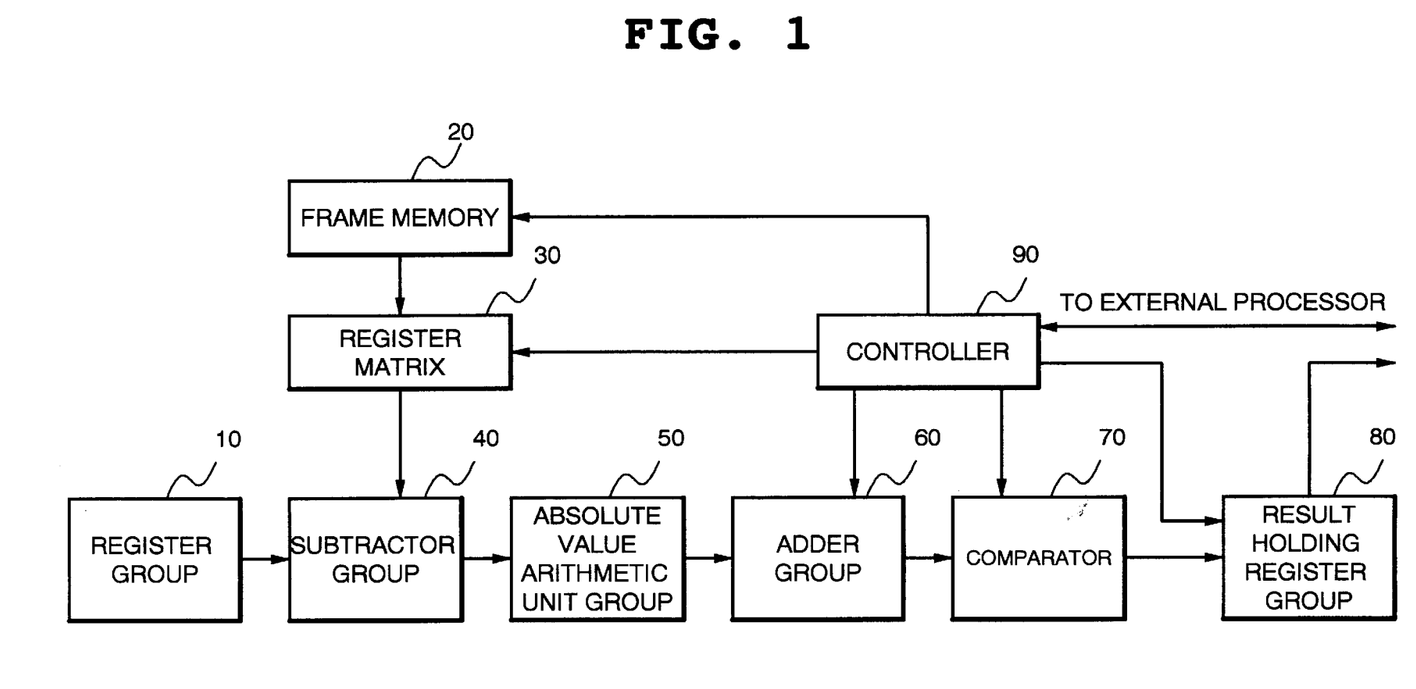
FIG. 1 is a block diagram of a motion vector detection circuit showing a first embodiment of the present invention.

FIG. 1 is a block diagram of a motion vector detection circuit showing a first embodiment of the present invention.

The motion vector detection circuit of the present embodiment, as illustrated in FIG. 1, includes a register group 10, a frame memory 20, a register matrix 30, a subtractor group 40, an absolute value arithmetic unit group 50, an adder group 60, a comparator 70, a result holding register group 80 and a controller 90.

The register group 10 is for storing picture data to be coded. Since in a motion compensating frame-to-frame predictive coding system such as MPEG2 or H.261, the size of a macro block is defined by 16 pixels by 16 lines, the register group 10 is composed of 256 registers and has each pixel data (8 bits) externally set at the start of motion vector search.

Stored in the frame memory 20 is a picture locally decoded in the above-described motion compensating frame-to-frame predictive coding system. By the control from the controller 90, the locally decoded picture stored in the frame memory 20 is sequentially read and set at the register matrix 30.

The subtractor group 40 is composed of 256 subtractors each of which has one input connected to its corresponding register within the register group 10 and the other input connected to its corresponding register within the register matrix 30. This arrangement enables each subtractor to execute subtraction between a pixel in a macro block to be coded and the corresponding pixel to be searched.

The absolute value arithmetic unit group 50 is composed of 256 absolute value generation circuits which turn individual results of subtraction executed by the subtractor group 40 into absolute values.

The adder group 60 is a 256-input adder which obtains a final addition result by adding each absolute value obtained by the absolute value arithmetic unit group 50. As the structure of the 256-input adder, multi-stage-connected adders may be formed as a pipeline in view of a latency of arithmetic.

The comparator 70 compares an addition result output from the adder group 60 and a value stored in the result holding register group 80 and when the addition result of the adder group 60 is smaller than the value stored in the result holding register group 80, updates the value in the result holding register group 80 by the value of the addition result of the adder group 60.

The result holding register group 80 is for holding a minimum addition result at a trial of motion vector search and a basic point vector value indicated by the controller 90 then.

The controller 90 supplies a clock signal and a control signal to each component of the motion vector detection circuit to operate as a sequencer of the entire motion vector detection circuit.

In addition, a host controller or an external processor which is not shown but located outside the motion vector detection circuit of FIG. 1 provides the interface between the motion vector detection circuit and a motion picture coding device such as updating of a macro block to be coded which is to be applied to the register group 10 and that of the frame memory 20, setting and starting of the controller 90 and reading of a motion vector search result.

Figure 2:
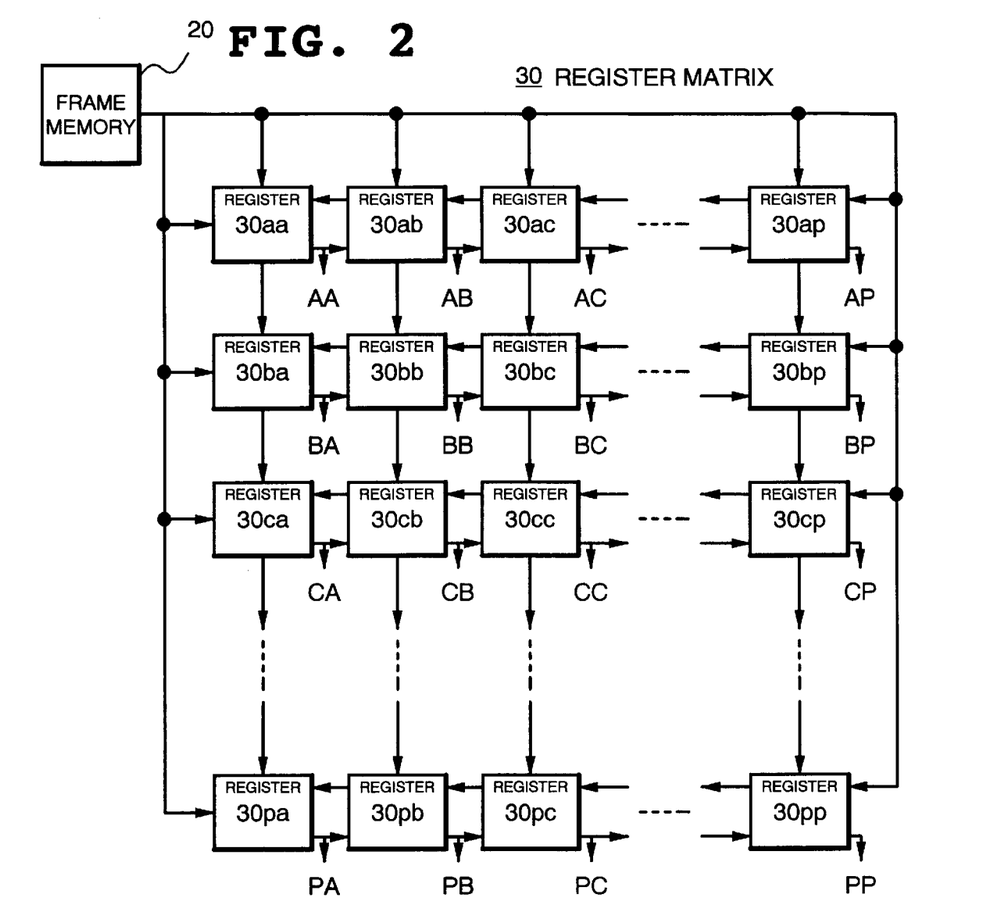
FIG. 2 is a block diagram showing an example of structure of a register matrix of the motion vector detection circuit according to the first embodiment of the present invention.
Figure 3:
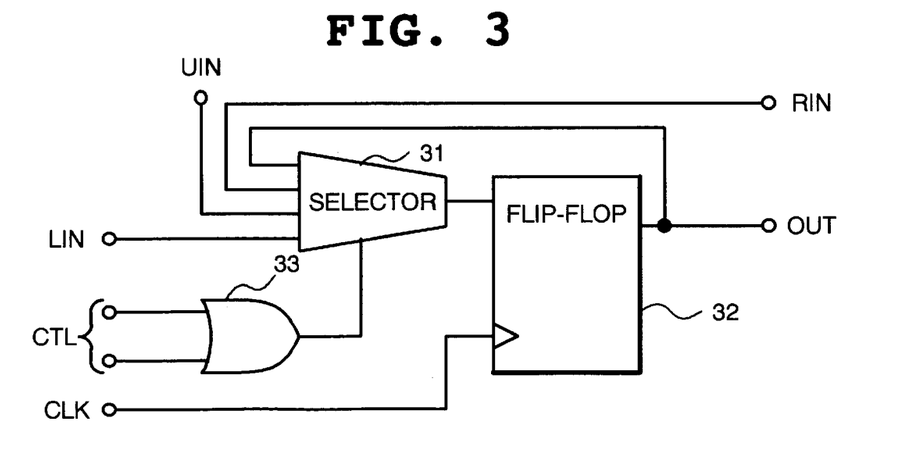
FIG. 3 is a block diagram showing an example of structure of each register of the above-described register matrix.

Next, detailed structure of the register matrix 30 will be described. FIGS. 2 and 3 are block diagrams illustrating an example of structure of the register matrix 30, FIG. 2 showing the entire structure of the register matrix 30 and FIG. 3 showing details of one component of the register matrix 30.

In FIG. 2, registers 30aa–30pp as components of the register matrix 30 are registers each having a 8-bit width which constitute a matrix of 16 rows by 16 columns as a whole. Each of the subscripts aa–pp indicates a position of a pixel in a locally decoded picture equivalent to one macro block of 16 rows by 16 columns. For example, aa indicates that the pixel is in the first row, the first column, ab indicates that the pixel is in the first row, the second column, ba indicates that the pixel is in the second row, the first column and pp indicates that the pixel is in the $16^{th}$ row, the $16^{th}$ column. In other words, alphabets a–p correspond to numerals 1–16.

Each of the registers 30aa–30pp, as illustrated in FIG. 3, includes a 4–1 selector 31 for selecting one of four inputs, a flip-flop 32 of a 8-bit width with the output of the 4–1 selector 31 as an input and a two-input OR circuit 33 of a 2-bit width and has three data input terminals, that is, an input terminal Lin from a neighbor register to its left, an input terminal Rin from a neighbor register to its right and an input terminal Uin from a neighbor register just above.

Laterally adjacent registers of the registers 30aa–30pp are connected to each other. More specifically, assuming that an arbitrary register is a first register as a reference, an output terminal (output terminal OUT of the flip-flop 32) of the first register and an input terminal RIN of a second register which is adjacent to the left of the first register are connected to each other and an output terminal OUT of the second register and an input terminal LIN of the first register are connected to each other.

Similarly, upper and lower adjacent registers of the respective registers 30aa–30pp are connected to each other. In this case, the direction of data flow is downward only and the output terminal OUT of the first register and an input terminal UIN of a third register located just below the first register are connected to each other.

As to registers located on the upper side, the left side and the right side of the matrix constituted by the registers 30aa–30pp, although there exist none of their right above, left hand and right hand neighbor registers, their input terminals are connected to the data output of the frame memory 20 to read data from the frame memory 20 in response to a control signal from the controller 90 which is not shown in FIG. 2. More specifically, input terminals UIN of the registers 30aa–30ap located on the upper side of the matrix, input terminals LIN of the registers 30aa–30pa located on the left side and input terminals Rin of the registers 30ap–30pp located on the right side are connected to the data output of the frame memory 20.

Four inputs of the 4–1 selector 31 are connected to the outputs of its own register, that is, the output terminal OUT of the flip-flop 32, the input terminal Rin from its right, the input terminal Uin from its just above and the input terminal Lin from its left.

In addition, since control from the controller 90 is basically given on the basis of a row or a column of the above-described matrix, a 2-bit two-output control signal CTL from the controller 90 is applied as a 2-bit control signal to the control input of the selector 31 via the two-input OR circuit 33 of a 2-bit width. Thus, the 4–1 selector 31 selects one of the four inputs and outputs the same to the flip-flop 32.

Then, 8-bit data outputs AA~PP output from the output terminals OUT of each of the registers 30aa–30pp are applied to one input of the subtractor group 40 and used in subtraction with their corresponding outputs in the register group 10.

The foregoing arrangement enables the respective registers 30aa–30pp to realize rightward and leftward data shifting in each row and downward data shifting in each column according to control of the controller 90.

Figure 4:
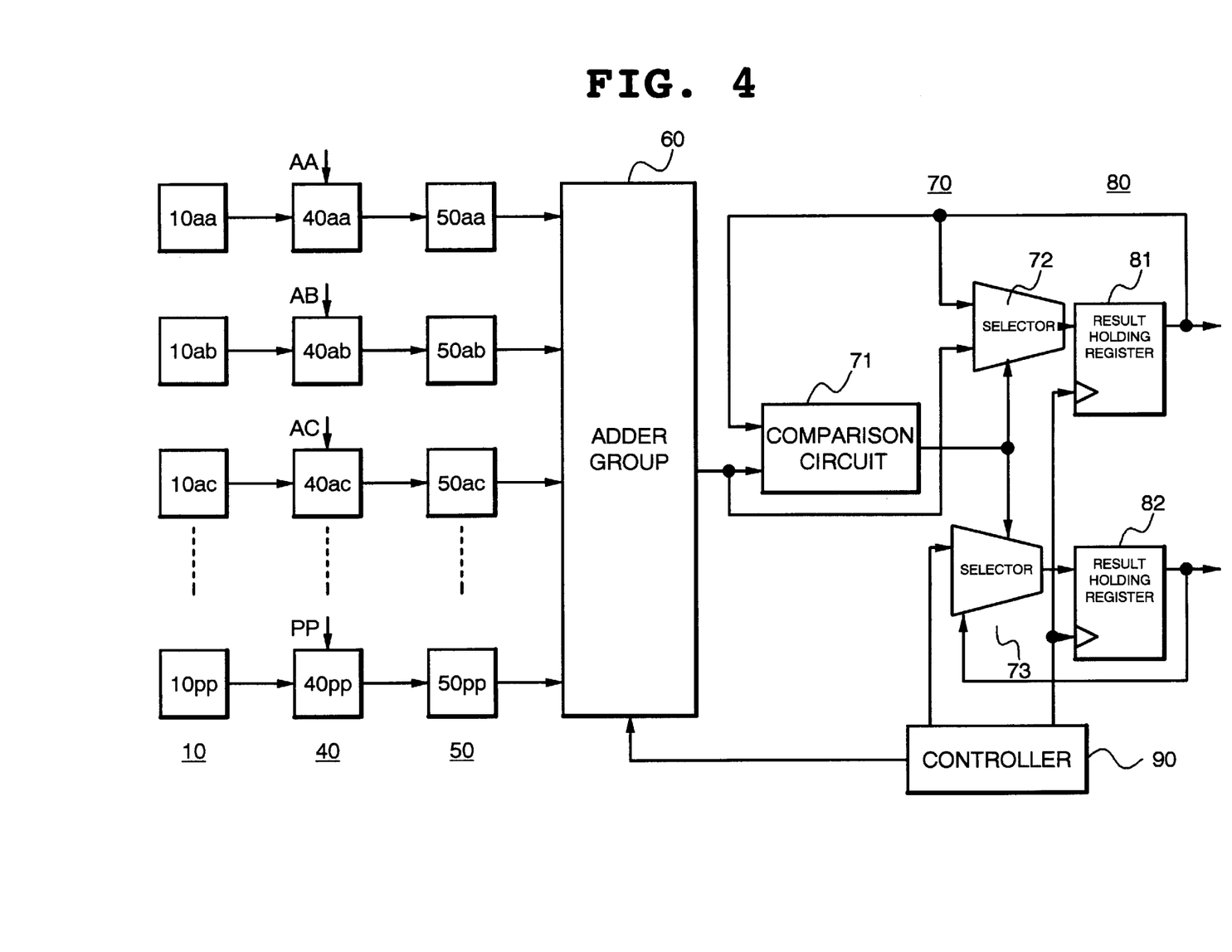
FIG. 4 is a block diagram showing an example of arrangement of a register group, a subtractor group, an absolute value arithmetic unit group, an adder group, a comparator group and a result holding register group.

Next, description will be made of a specific example of structure of the remaining components with reference to FIG. 4. The register group 10 is composed of 256 registers 10aa–10pp of a 8-bit width. Each of the subscripts aa–pp indicates a position of a pixel in a matrix of 16 rows by 16 columns (aa indicates that a pixel is in the first row, the first column, ab indicates that a pixel is in the first row, the second column, ba indicates that a pixel is in the second row, the first column, and pp indicates that a pixel is in the $16^{th}$ row, the $16^{th}$ column).

The subtractor group 40 is composed of 256 subtractors 40aa–40pp of 16-bit precision. The subtractors 40aa–40pp correspond to the respective pixels of one macro block and subtract their corresponding output of the registers 10aa–10pp from their corresponding data outputs AA~PP of the register matrix 30, respectively.

The absolute value arithmetic unit group 50 is composed of 256 absolute value generation circuits 50aa–50pp of 16-bit precision. The absolute value generation circuits 50aa–50pp correspond to the respective pixels of one macro block and turn their corresponding outputs of the subtractors 40aa–40pp into absolute values.

The adder group 60 is an adder with 256 inputs each having a 16-bit width which adds each 16-bit arithmetic result output from the absolute value generation circuits 50aa–50pp to obtain an addition result of a 24-bit width.

The comparator 70 includes an absolute value comparison circuit 71 of a 24-bit width, a 2–1 selector 72 of a 24-bit width and a 2–1 selector 73 of a 20-bit width. The absolute value comparison circuit 71 compares an arithmetic result of the adder group 60 and a value held by the result holding register group 80 and controls switching between the 2–1 selector 72 and the 2–1 selector 73 based on the comparison result.

The result holding register group 80 includes a result holding register 81 of a 24-bit width for holding one trial result of motion vector search for one macro block (a sum of difference absolute values between the corresponding pixels in a trial range and in a macro block 101) and a result holding register 82 of a 20-bit width for holding a basic point vector being output from the controller 90 when the trial result is stored in the register 81.

The controller 90 controls operation timing of the adder group 60, the result holding register group 80, the frame memory 20 and the register matrix 30.

Figure 5:
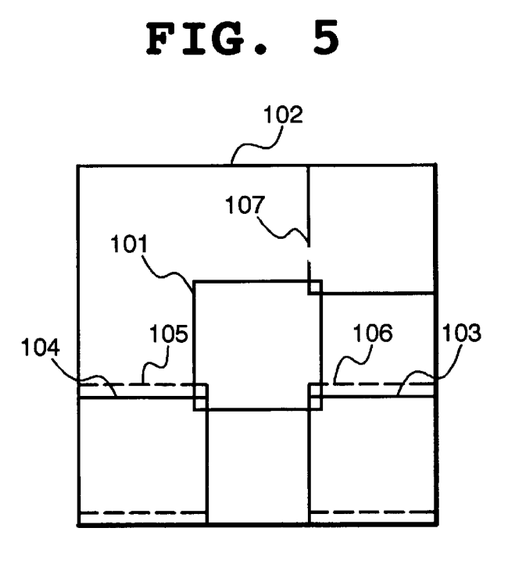
FIG. 5 is a diagram for use in explaining motion vector search by the motion vector detection circuit of FIG. 1.

Description will be next made of operation of thus structured motion vector detection circuit according to the present embodiment with reference to FIGS. 1 to 5. In a motion picture coding device employing a predictive coding system such as MEPG2, a macro block to be coded is in general made up of 16 pixels by 16 lines. In FIG. 5, the macro block to be coded is denoted as the reference numeral 101.

Next, a motion vector search range for this macro block has a region ranging as many as pixels and lines in the horizontal and vertical directions with respect to the macro block 101, and assuming that the region ranges from –15 pixels to +15 pixels in both the horizontal and the vertical directions, a range 102 will be a search range as illustrated in FIG. 5. The size of the motion vector search range 102 can be arbitrarily set by the side of the coding device.

In the present invention, first, an external processor (or host controller) writes data of the macro block 101 to be coded into the registers 10aa–10pp of the register group 10 on a pixel basis. At this time, the data is sequentially written in a fixed order, like data in the first row of the macro block 101 into the registers 10aa–10ap and data in the second row into the registers 10ba–10bp, and data in the $16^{th}$ row is written into the registers 10pa–10pp.

Next, the external processor sets an initial basic point vector within the motion vector search range at the controller 90 and causes the controller 90 to start a sequence.

Upon being instructed to start the sequence by the external processor, the controller 90 first sets a value of the result holding register 81 to a maximum value. At this time, the initial basic point vector corresponds to the upper left hand corner part of a first trial range (block to be compared) 103 of 16 pixies by 16 lines in the motion vector search range 102.

Then, the controller 90 sequentially reads as many pixel data existing in the region of the first trial range 103 as the number of pixels in the macro block 101 from the frame memory 20 and writes the same into the register matrix 30. The data writing is executed in a manner as described below.

First, the controller 90 outputs an address of pixel data at the upper right hand corner of the trial range 103 from the frame memory 20, as well as applying, to the registers 30aa–30ap in the first row in the register matrix 30, a control signal CTL for selecting a data input (Lin) from their left hand side. At this time, the controller 90 applies, to the other registers 30ba–30pp, a control signal CTL for selecting their own data output OUT.

The controller 90 outputs a clock CLK to all the registers 30aa–30pp of the register matrix 30 at the timing for stabilizing output of the frame memory 20 and operation of the register matrix 30. Responsively, each flip-flop 32 in the registers 30aa–30pp latches 8-bit data applied through the selector 31.

Subsequently, the controller 90 outputs an address in the row second to the previously output pixel data address, as well as applying, to the registers 30ba–30bp in the second row in the register matrix, the control signal CTL for selecting a data input (Lin) from their left hand side. At this time, to the other registers 30aa–30ap and 30ca–30pp, the controller 90 applies the control signal CTL for selecting their own data output OUT.

The controller 90 outputs a clock CLK to all the registers 30aa–30pp of the register matrix 30 at the timing for stabilizing output of the frame memory 20 and operation of the register matrix 30. Responsively, each flip-flop 32 in the registers 30aa–30pp latches 8-bit data applied through the selector 31.

Repeating the foregoing processing for the right end of the trial range 103, that is, the processing of bringing down an address of pixel data to be applied to the frame memory 20 one row each, as well as bringing down a register which is to select a data input from its left hand side in the register matrix 30 one row each until reaching the $16^{th}$ row results in that the respective pixels at the right end in the trial range 103 will have been stored at the registers 30aa–30pa in the first column from the left side of the register matrix 30 in the original order.

Subsequently, the controller 90 outputs an address of pixel data in the second column from the right side of the trial range 103 and on the same line as that of the upper end of the trial range 103 to the frame memory 20, as well as applying, to the registers 30aa–30ap in the first row in the register matrix 30, the control signal CTL for selecting a data input (Lin) from their left hand side. At this time, to the other registers 30*ba*–30*pp*, the controller 90 applies the control signal CTL for selecting its own data output OUT.

The controller 90 outputs a clock CLK to all the registers 30*aa*–30*pp* at the timing for stabilizing output of the frame memory 20 and operation of the register matrix 30.

Subsequently, the controller 90 outputs an address located in the second column from the right side of the trial range 103 and in the second row to the frame memory 20, as well as applying, to the registers 30*ba*–30*bp* in the second row in the register matrix 30, the control signal CTL for selecting a data input (Lin) from their left hand. At this time, to the other registers 30*aa*–30*ap* and 30*ca*–30*pp*, the controller 90 applies the control signal CTL for selecting their own data output OUT. The controller 90 outputs a clock CLK to the registers 30*aa*–30*pp* at the timing for stabilizing output of the frame memory 20 and operation of the register matrix 30.

Repeating the foregoing processing for the second column from the right side until reaching the 16$^{th}$ row in a manner as mentioned above results in that the respective pixels at the right end in the trial range 103 will be stored in the registers 30*ab*–30*pb* in the second column from the left side of the register matrix 30 in the original order, while the respective pixels in the second column from the right side in the trial range 103 will be stored in the registers 30*aa*–30*pa* at the left end in the original order.

Subsequently repeating the foregoing processing for the third column from the right side of the trial range 103 until reaching the 16$^{th}$ row in the same manner as that mentioned above results in that the respective pixels at the right end in the trial range 103 will be stored at the registers 30*ac*–30*pc* in the third column from the left side of the register matrix 30 in the original order, the respective pixels in the second column from the right side in the trial range 103 will be stored in the registers 30*ab*–30*pb* in the second column from the left side in the original order and the pixels in the third column from the right side in the trial range 103 will be stored in the registers 30*aa*–30*pa* at the left end in the original order.

When such processing is repeated to complete the processing for the 16$^{th}$ column from the right side of the trial range 103, that is, the left end of the trial range 103, the data of the trial range 103 will have been stored in the respective registers 30*aa*–30*pp* of the register matrix 30 as it is.

Here, motion vector search operation is started. More specifically, the subtractor 40*aa* subtracts the output of the register 10*aa* which stores data of the pixel in the upper left of the macro block 101 to be coded from the output AA of the register 30*aa* in the upper left of the register matrix 30, while the subtractor 40*ab* subtracts the output of the register 10*ab* from the output AB of the register 30*ab* in the register matrix 30.

The remaining subtractors 40*ac*–40*pp* similarly subtract, from the respective outputs AC–PP of the registers 30*ac*–30*pp*, the respective outputs of the corresponding registers 10*ac*–10*pp*.

Such subtraction processing between the corresponding pixels in the trial range 103 and the macro block 101 is executed in parallel.

The absolute value generation circuits 50*aa*–50*pp* in the absolute value arithmetic unit group 50 turns 16-bit subtraction results of their corresponding subtractors 40*aa*–40*pp*. This processing by the absolute value arithmetic unit group 50 is also executed for 256 pixels in parallel.

The adder group 60 adds each output of the absolute value generation circuits 50*aa*–50*pp* to obtain an addition result of a 24-bit width.

The absolute value comparison circuit 71 in the comparator 70 compares an addition result of the adder group 60 and a value held in the result holding register 81 and when the addition result of the adder group 60 is smaller than the value held in the register 81, controls the 2–1 selector 72 so as to select the output of the adder group 60, as well as controlling the 2–1 selector 73 so as to select the output of the controller 90.

Then, upon application of a clock to the result holding registers 81 and 82 by the controller 90, the addition result of a 24-bit width output from the adder group 60 is held in the register 81 through the selector 72 and a basic point vector (basic point vector in the trial range 103) of a 20-bit width output from the controller 90 is held in the register 82 through the selector 73.

The foregoing procedures complete one step of motion vector search.

Since when an addition result of the adder group 60 is more than a value held in the register 81, the absolute value comparison circuit 71 in the comparator 70 controls the selector 72 so as to select the output of the result holding register 81, as well as controlling the selector 73 so as to select the output of the result holding register 82, no updating will be made of a value held in the result holding register group 80.

Next, although with respect to a region obtained by shifting the region of the trial range 103 to the left by one pixel column, the controller 90 similarly obtains an addition result of the adder group 60, that is, a sum of difference absolute values of 256 pixels, since the data of the trial range 103 is already stored in the register matrix 30, it is only necessary to read, with respect to the pixel column adjacent to the left of the trial range 103, 16 pixels from the frame memory 20 in the order, the row of registers 30*aa*–30*ap*, the row of the registers 30*ba*–30*bp*, . . . the row of the registers 30*pa*–30*pp*, as is previously done.

More specifically, the controller 90 outputs, to the frame memory 20, an address of pixel data in the column adjacent to the left of the trial range 103 and on the same line as that of the upper end of the trial range 103, as well as applying, to the registers 30*aa*–30*pp*, the control signal CTL for selecting a data input (Lin) from their left hand side, applying, to the other registers 30*ba*–30*pp*, the control signal CTL for selecting their own output OUT and outputting the clock CLK to the registers 30*aa*–30*pp*.

Such processing for the column adjacent to the left of the trial range 103 will be repeated until reaching the 16$^{th}$ row in the same manner as mentioned above.

16 times of data reading results in that data at a pixel column shifted to the left by one column from the trial range 103 is stored in the register matrix 30.

Since at this time point, a sum of difference absolute values between the corresponding pixels in the trial range stored in the register matrix 30 and the macro block 101 can be calculated, the arithmetic result and the value held in the result holding register 81 are compared at the absolute value comparison circuit 71 to update or hold the contents of the result holding register group 80 in the same manner as mentioned above.

Repeating such processing of shifting a trial range to the left by one pixel column 30 times results in that data of a trial range 104 is stored in the respective registers 30*aa*–30*pp* of the register matrix 30.

Since at this time point, the processing reaches the left end of motion vector search range 102, after the calculation of a sum of absolute values of a difference between the corresponding pixels in the trial range 104 and the macro block 101 and updating or holding of the contents of the result holding register group 80 are completed, it is necessary to store data obtained after shifting the trial range 104 upward by one line in the register matrix 30.

In this case, the controller 90 provides control on the basis of registers 30aa–30pa, 30ab–30pb, . . . 30ap–30pp in the column direction in the register matrix 30 to cause the selector 31 of each of the registers 30aa–30pp to enter a mode of latching data from the upper side with respect to an active column and enter a mode of latching its own output data with respect to the other columns.

In other words, the controller 90 outputs an address of pixel data at the leftmost right above the trial range 104 to the frame memory 20, as well as applying, to the registers 30aa–30pa in the first column from the left of the register matrix 30, a control signal CTL for selecting a data input (Uin) from its right above and applying, to the other registers 30ab–30pp, the control signal CTL for selecting its own data output OUT. The controller 90 outputs the clock CLK to the registers 30aa–30pp at the timing of stabilizing the output of the frame memory 20 and the operation of the register matrix 30.

Subsequently, the controller 90 outputs an address located one column to the right of the previously output pixel data address to the frame memory 20, as well as applying, to the registers 30ab–30pb in the second column from the left in the register matrix 30, the control signal CTL for selecting a data input (Uin) from its right above and applying, to the other registers 30aa–30pa and 30ac–30pp, the control signal CTL for selecting its own data output OUT. Then, the controller 90 outputs the clock CLK to the registers 30aa–30pp.

Repeating the foregoing processing for the one line right above the trial range 104 until reaching the 16$^{th}$ column results in that data of a trial range 105 obtained by shifting the trial range 104 upward by one line is stored in the register matrix 30.

In the same manner as described above, a sum of absolute values of a difference between the corresponding pixels in the trial range 105 and the macro block 101 is calculated to update or hold the contents of the result holding register group 80.

At the next step, conversely, for shifting the data of the register matrix 30 rightward, the controller 90 provides control on the basis of registers 30aa–30ap, 30ba–30bp, . . . 30pa–30pp in the row direction in the register matrix 30 to cause the 4–1 selector 31 of each of the registers 30aa–30pp to enter a mode of latching data from the right with respect to an active row and enter a mode of latching its own output data with respect to the other columns.

In other words, the controller 90 outputs an address of pixel data in a column adjacent to the right of the trial range 105 and in the same line as that of the upper end of the trial range 105 to the frame memory 20, as well as applying, to the registers 30aa–30ap in the first column in the register matrix 30, a control signal CTL for selecting a data input (Rin) from its right hand side and applying, to the other registers 30ba–30pp, the control signal CTL for selecting its own data output OUT.

The controller 90 outputs the clock CLK to all the registers 30aa–30pp of the register matrix 30 at the timing for stabilizing the output of the frame memory 20 and the operation of the register matrix 30.

Subsequently, the controller 90 outputs an address located one row below the previously output pixel data address to the frame memory 20, as well as applying, to the registers 30ba–30bp in the second row in the register matrix 30, the control signal CTL for selecting a data input (Rin) from its right hand side and applying, to the other registers 30aa–30ap and 30ca–30pp, the control signal CTL for selecting its own data output OUT. Then, the controller 90 outputs the clock CLK to the registers 30aa–30pp.

Repeating the foregoing processing for the column adjacent to the right of the trial range 105 until reaching the 16$^{th}$ row results in that data of a trial range obtained by shifting the trial range 105 rightward by one pixel column is stored in the register matrix 30.

In the same manner as described above, a sum of absolute values of a difference between the corresponding pixels in this trial range and the macro block 101 is calculated to update or hold the contents of the result holding register group 80.

Repeating the processing of shifting a trial range rightward by one pixel column 30 times will result in that data in a trial range 106 located one line above the trial range 103 is stored in the respective registers 30aa–30pp of the register matrix 30.

Since at this time point, the processing reaches the right end of the motion vector search range 102, after the calculation of a sum of absolute values of a difference between the corresponding pixels in the trial range 106 and the macro block 101 and updating or holding of the contents of the result holding register group 80 are completed, it is necessary to store data obtained after shifting the trial range 106 upward by one line in the register matrix 30.

The processing conducted at this time is the same as that conducted when the trail range 104 is shifted to the trial range 105. Hereafter, repetition of the processing for the trial range 103 on is only necessary.

Figure 6:
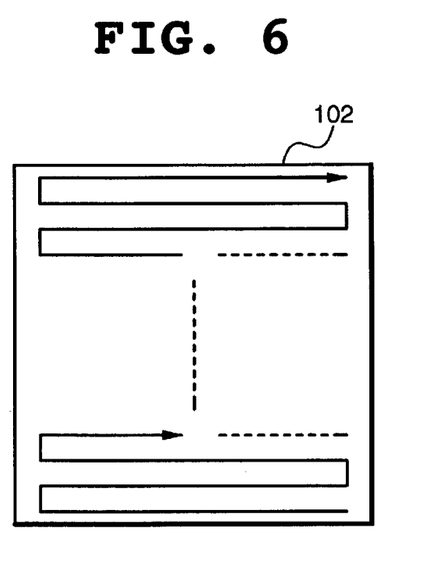
FIG. 6 is a diagram for use in explaining the order in which data within a motion vector search range is stored in a register matrix.

Thus, in the register matrix 30, data of the motion vector search range 102 is stored in such an order as indicated by the arrow in FIG. 6.

Motion vector search for one macro block is completed when the data stored in the register matrix 30 reaches the region of a trial range 107, that is, when scanning of the entire region of the motion vector search range 102 is finished.

Then, the controller 90 generates an interruption to the external processor to give a notification of the completion of the search.

At this time, since by referring to the result holding register group 80, the external processor is allowed to obtain a minimum value of a sum of difference absolute values held in the register 81 and a basic point vector which is obtained at the time when the minimum value of the sum of the difference absolute values is obtained and which is held in the register 82, a motion vector value can be obtained with ease.

With the register matrix 30 thus designed to be shift registers having two-dimensional structure, the motion vector detection circuit of the present embodiment reduces the need of repeatedly reading pixel data to be searched from the frame memory which is required by a conventional motion vector detection circuit down to a minimum necessary number of times of reading, thereby speeding up motion vector search processing.

More specifically, by designing registers in an m by n matrix to be shift registers having two-dimensional structure by two-dimensionally connecting the registers to each other such that inputs and outputs of laterally adjacent registers are bidirectionally connected and inputs and outputs of vertically adjacent registers are unidirectionally connected (from the upside to the downside or from the downside to the upside), the number of times of data reading from the frame memory 20 to a register can be drastically reduced to speed up detection of a motion vector.

Although the present embodiment is structured to have data applied to the respective registers 30aa–30pp in the register matrix 30 from the upside, it is clear that data can be applied from the downside.

In this case, the controller 90 should control the frame memory 20 and the register matrix 30 such that the data of the motion vector search range 102 is stored in the register matrix 30 in the order vertically reverse to that shown in FIG. 6.

Figure 8:
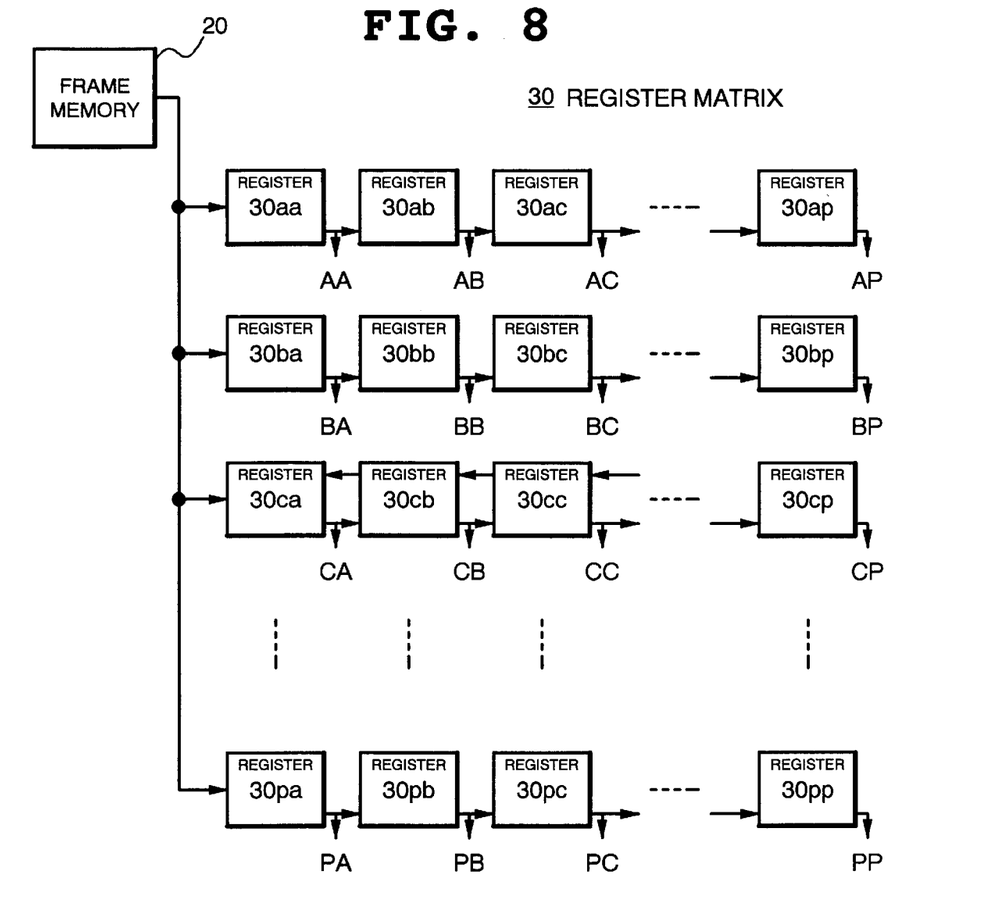
FIG. 8 is a block diagram showing an example of arrangement of a register matrix of a motion vector detection circuit according to a second embodiment of the present invention.

Next, a second embodiment of the present invention will be described. In the second embodiment, the respective registers 30aa–30pp in the register matrix 30 are structured without a path connecting in the column direction and a connection path from the right side which are shown in FIG. 2. The structure of the register matrix 30 in the second embodiment is illustrated in FIG. 8.

Figure 9:
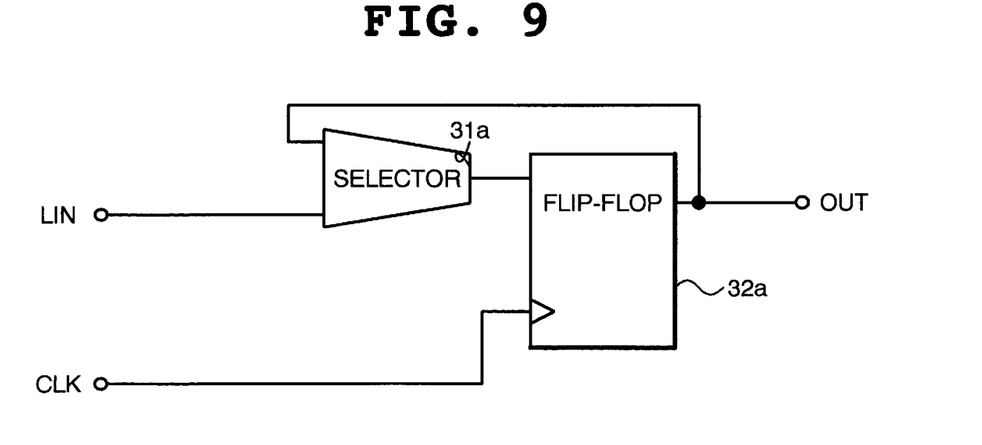
FIG. 9 is a block diagram showing an example of structure of each register of the above-described register matrix.

In this case, as to the respective registers 30aa–30pp in the register matrix 30, the input terminals UIN and RIN are unnecessary as illustrated in FIG. 9 and the control of the controller 90 is conducted only in a row direction, so that the modes are that of latching data from the left and that of latching its own output data, whereby the two-input OR circuit 33 is also unnecessary and the control signal CTL from the controller 90 only needs one bit.

Figure 7:
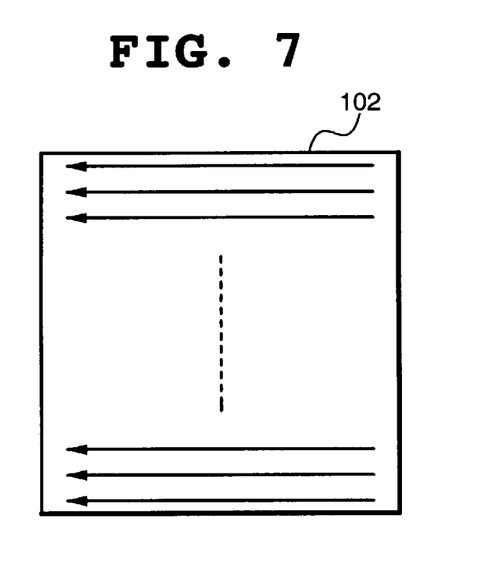
FIG. 7 is a diagram for use in explaining the order in which data within a motion vector search range is stored in a register matrix.

In the present embodiment, the register matrix 30 is structured to have 16 rows of shift registers in parallel whose one row has 16 pixels, whereby data of the motion vector search range 102 is stored in the register matrix 30 in such an order as indicated by the arrow in FIG. 7.

The advantages of the structure of present embodiment are that the arrangement of the register matrix 30 is simplified to reduce a scale of hardware and that data flow can be simplified to enable a sequencer of the controller 90 to have simple structure.

By thus one-dimensionally connecting registers in an m by n matrix to each other such that inputs and outputs of laterally adjacent registers are unidirectionally connected (from left to right or from right to left) to have 16-stage parallel shift registers, circuit scale can be reduced while reducing the number of times of data reading from the frame memory 20 to the registers.

Comparison in the number of times of data reading from the frame memory 20 which is the advantage of the present invention, however, finds that assuming that a motion vector search range ranges from −15 pixels to +15 pixels in both the horizontal and the vertical directions, the number of times is 15,616 times in the first embodiment and that in the second embodiment is 22,816 times, about 1.5 times increase.

Therefore, which structure is to be selected is determined by the tradeoff between giving priority to speediness of a motion picture coding device and giving importance to hardware scale, that is, cost.

Although the second embodiment is structured to have data applied to the registers 30aa–30pp in the register matrix 30 from the left side, it is clear that it may be structured to have data applied from the right side. In this case, the controller 90 should control the frame memory 20 and the register matrix 30 such that data in the motion vector search range 102 is stored in the register matrix 30 in the order horizontally reverse to that shown in FIG. 7.

In addition, although the size of a macro block is 16 pixels by 16 lines both in the first and the second embodiments, it is clear that the size is not limited thereto.

As described in the foregoing, since by the provision of second registers for storing each pixel data of a comparison target block to be compared with a current coding target macro block which registers are arranged in an m×n matrix and connected two-dimensionally or one-dimensionally to each other, the motion vector detection circuit of the present invention enables the number of times of reading from a frame memory to the second registers for motion vector search to be reduced down to be smaller by one or more digits than that by a conventional motion vector detection circuit, thereby drastically reducing a motion vector detection time, and when the size of a search range is the same as that of conventional devices, reducing a processing time of a motion picture coding device.

Assuming, for example, that motion vector search bounds ranges from −15 pixels to +15 pixels in both the horizontal and the vertical directions, the number of times of reading from a frame memory is 246,016 times in a conventional motion vector detection circuit, while the number of times can be reduced to 15,616 times in the motion vector detection circuit of the present invention.

Moreover, since a motion vector detection time can be drastically reduced, with a processing time allowed to be the same as that of a conventional motion picture coding device, the size of a motion vector search range can be enlarged, contributing to the improvement of data compressibility of the motion picture coding device.

In addition, since the arrangement of the second registers is so regular that when the motion vector detection circuit of the present invention is mounted in an LSI, hardware can be made into a macro with ease, the motion picture coding device in real-time operation can be compacted.

Also, data flow of the second registers is so regular that a sequencer of a control means (controller) can be simply structured and a motion vector search range can be changed with ease.

For example, if control of a sequencer is provided by two counters and decoders, and a comparator and a register are arranged in the decoders, the motion vector search bounds can be changed in the range of from −15 to +15 to from −255 to +255 with ease.

Moreover, by one-dimensionally connecting second registers in an m by n matrix to each other such that inputs and outputs of laterally adjacent registers are unidirectionally connected to have 16-stage parallel shift registers, circuit scale can be reduced while reducing the number of times of data reading from a frame memory to second registers.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A motion vector detection circuit for conducting motion vector search by, with a frame picture as a coding target being divided into a plurality of macro blocks of m pixels by n lines, comparing a plurality of comparison target blocks of m pixels by n lines within a search range of a predetermined size set in a frame picture immediately preceding or succeeding in time said frame picture and said macro block as the current coding target to specify a comparison target block most similar to the macro block as the current coding target, comprising:

- first storage means for storing each pixel data of said macro block as the current coding target;
- second storage means of m by n matrix arrangement having two-dimensional or one-dimensional structure for storing each pixel data of said comparison target block;
- arithmetic means for performing parallel arithmetic of an absolute value of a difference between the corresponding pixels in said comparison target block stored in said second storage means and in said macro block stored in said first storage means to calculate a sum of the respective difference absolute values;
- result holding means for holding said sum of difference absolute values; and
- control means for updating said result holding means by said sum of difference absolute values from said arithmetic means only when said sum of difference absolute values from said arithmetic means is smaller than a sum of difference absolute values held in said result holding means and causing said second storage means to store each pixel data of other said comparison target block which comes next at a position shifted by one pixel or one line within said search range.

2. The motion vector detection circuit as set forth in claim 1, wherein
said second storage means is composed of a number m×n of registers which have two-dimensional structure where inputs and outputs of laterally adjacent registers are bidirectionally connected and inputs and outputs of vertically adjacent registers are unidirectionally connected.

3. The motion vector detection circuit as set forth in claim 1, wherein
said second storage means is composed of a number m×n of registers which have two-dimensional structure where inputs and outputs of laterally adjacent registers are bidirectionally connected and inputs and outputs of vertically adjacent registers are unidirectionally connected, and
said register is composed of a flip-flop and a four-input one-output selector.

4. The motion vector detection circuit as set forth in claim 1, wherein
said second storage means is composed of a number m×n of registers which have one-dimensional structure where inputs and outputs of laterally adjacent registers are unidirectionally connected.

5. The motion vector detection circuit as set forth in claim 1, wherein
said second storage means is composed of a number m×n of registers which have one-dimensional structure where inputs and outputs of laterally adjacent registers are unidirectionally connected, and
said register is composed of a flip-flop and a two-input one-output selector.

6. The motion vector detection circuit as set forth in claim 1, wherein
said control means, at the time of updating said result holding means by said sum of difference absolute values from said arithmetic means, stores reference position data of said comparison target block corresponding to said sum of difference absolute values.

7. The motion vector detection circuit as set forth in claim 1, wherein
said arithmetic means comprising
subtraction means for performing subtraction between the corresponding pixels in said comparison target block and said macro block,
absolute value arithmetic means for turning said result of subtraction between said pixels into an absolute value to obtain said difference absolute value, and
addition means for adding said difference absolute values to calculate said sum of difference absolute values.

8. The motion vector detection circuit as set forth in claim 1, further comprising comparison means for comparing said sum of difference absolute values from said arithmetic means and a sum of difference absolute values held in said result holding means, wherein
said control means updates said result holding means by said sum of difference absolute values from said arithmetic means only when said sum of difference absolute values from said arithmetic means is smaller than a sum of difference absolute values held in said result holding means based on a comparison result from said comparison means.

9. A motion vector detection circuit for conducting motion vector search by, with a frame picture as a coding target being divided into a plurality of macro blocks of m pixels by n lines, comparing a plurality of comparison target blocks of m pixels by n lines within a search range of a predetermined size set in a frame picture immediately preceding or succeeding in time said frame picture and said macro block as the current coding target to specify a comparison target block most similar to the macro block as the current coding target, comprising:

- first storage means for storing each pixel data of said macro block as the current coding target;
- second storage means of m by n matrix arrangement having two-dimensional or one-dimensional structure for storing each pixel data of said comparison target block; and
- control means for conducting comparison processing of said comparison target block stored in said second storage means and said macro block stored in said first storage means while sequentially storing, in said second storage means, each pixel data of other said comparison target block which comes next at a position shifted by one pixel or one line within said search range.

10. The motion vector detection circuit as set forth in claim 9, wherein
said second storage means is composed of a number m×n of registers which have two-dimensional structure where inputs and outputs of laterally adjacent registers are bidirectionally connected and inputs and outputs of vertically adjacent registers are unidirectionally connected.

11. The motion vector detection circuit as set forth in claim 9, wherein
said second storage means is composed of a number m×n of registers which have one-dimensional structure where inputs and outputs of laterally adjacent registers are unidirectionally connected.

12. The motion vector detection circuit as set forth in claim 9, further comprising arithmetic means for performing parallel arithmetic of an absolute value of a difference between the corresponding pixels in said comparison target block stored in said second storage means and in said macro block stored in said first storage means to calculate a sum of the respective difference absolute values, and result holding means for holding said sum of difference absolute values, wherein said control means updates said result holding means by said sum of difference absolute values from said arithmetic means only when said sum of difference absolute values from said arithmetic means is smaller than a sum of difference absolute values held in said result holding means.

* * * * *